United States Patent [19]

Olson

[11] Patent Number: 4,860,583

[45] Date of Patent: Aug. 29, 1989

[54] AIR VELOCITY TRANSMITTER DEVICE

[75] Inventor: Thomas R. Olson, Chesterton, Ind.

[73] Assignee: Dwyer Instruments, Inc., Michigan City, Ind.

[21] Appl. No.: 199,955

[22] Filed: May 27, 1988

[51] Int. Cl.$^4$ .............................................. G01F 1/68
[52] U.S. Cl. ................. 73/204.15; 73/204.18
[58] Field of Search ............ 73/204.14, 204.15, 204.18

[56] References Cited

U.S. PATENT DOCUMENTS

| | | | |
|---|---|---|---|
| 3,363,462 | 1/1968 | Sabin | 73/204.18 |
| 4,475,388 | 10/1984 | Kawai et al. | 73/204.18 |
| 4,537,068 | 8/1985 | Wrobel et al. | 73/202 |
| 4,627,279 | 12/1986 | Ohta et al. | 73/204.15 X |
| 4,718,279 | 1/1988 | Hestich | 73/734 |

*Primary Examiner*—Herbert Goldstein
*Attorney, Agent, or Firm*—Mann, McWilliams, Zummer & Sweeney

[57] ABSTRACT

An instrument probe has two sensing elements; one is a self heated thermistor that serves as the air velocity sensor, and a second sensing element in the form of a chip thermistor, that are separately but simultaneously exposed, in the use of the instrument probe, to the air flow, with the self heated thermistor and the thermistor chip are incorporated in a self regulating bridge circuit, that, when the unit is powered, generates a non-linear signal that is applied to signal processing circuitry within the unit housing to adjust same for gain and off set with the resulting signal being applied to a linearizer circuit also within the unit housing wherein the signal is electronically processed to supply the unit output signal in the familiar 4–20 milliamp range. The transmitter device is arranged to be powered by either an alternating current or direct current supply that is in the range of about 22 volts to about 28 volts.

2 Claims, 8 Drawing Sheets

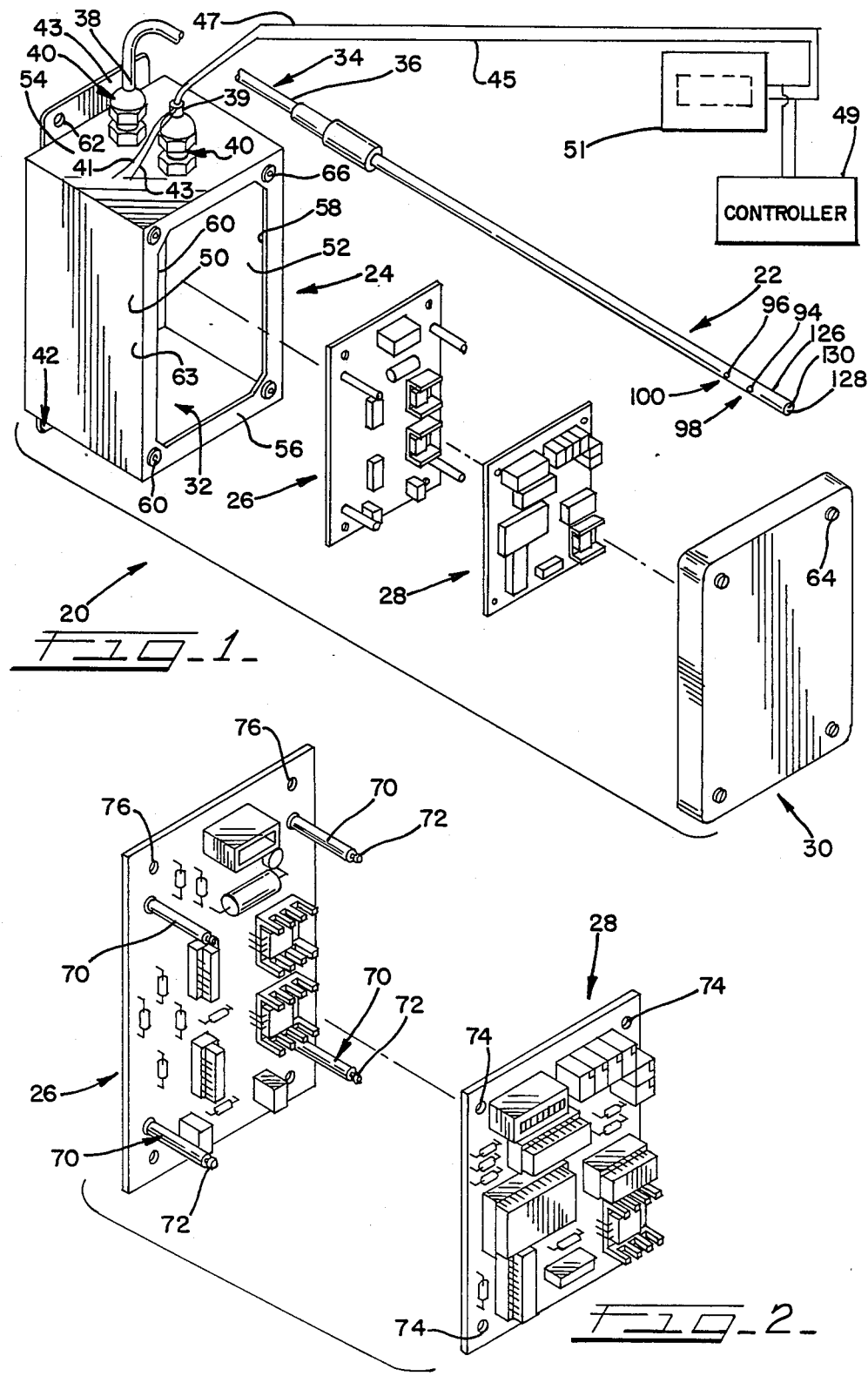

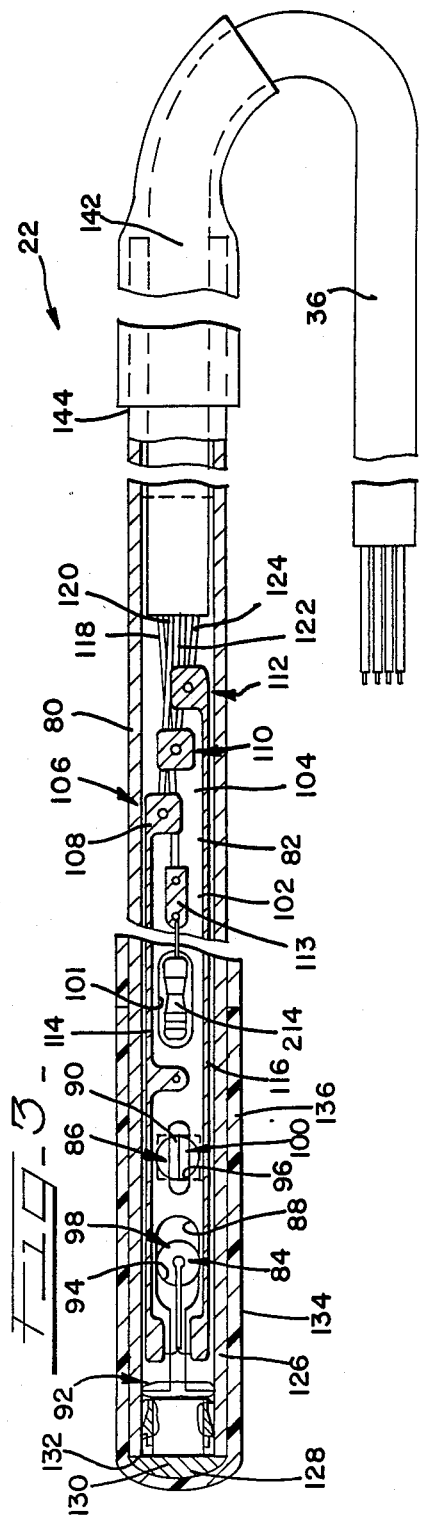
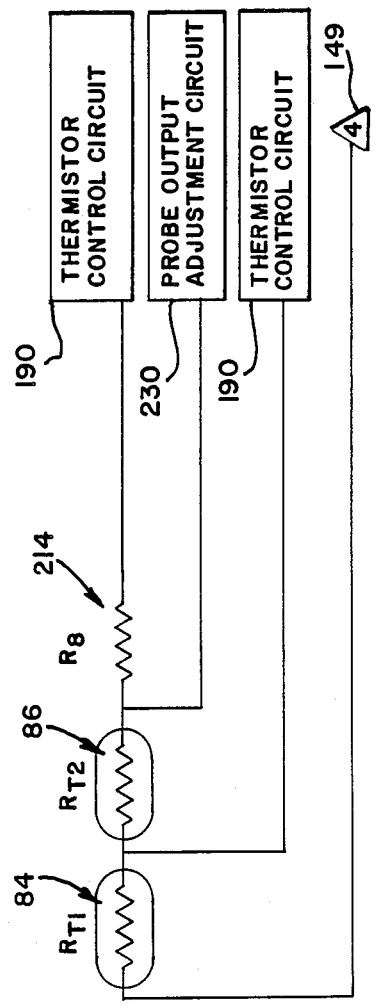
FIG-3
FIG-4

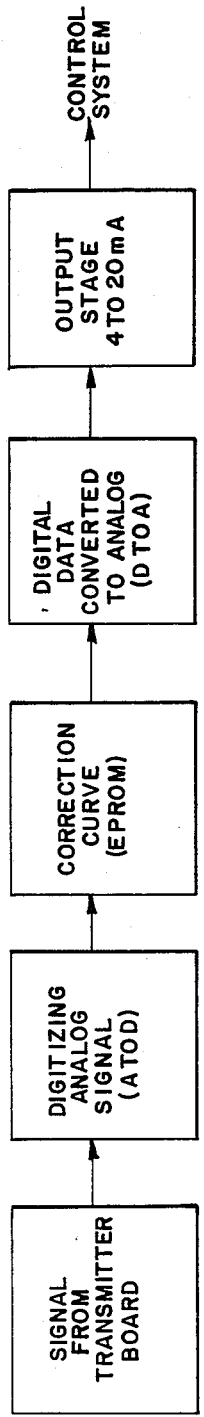
FIG-5-
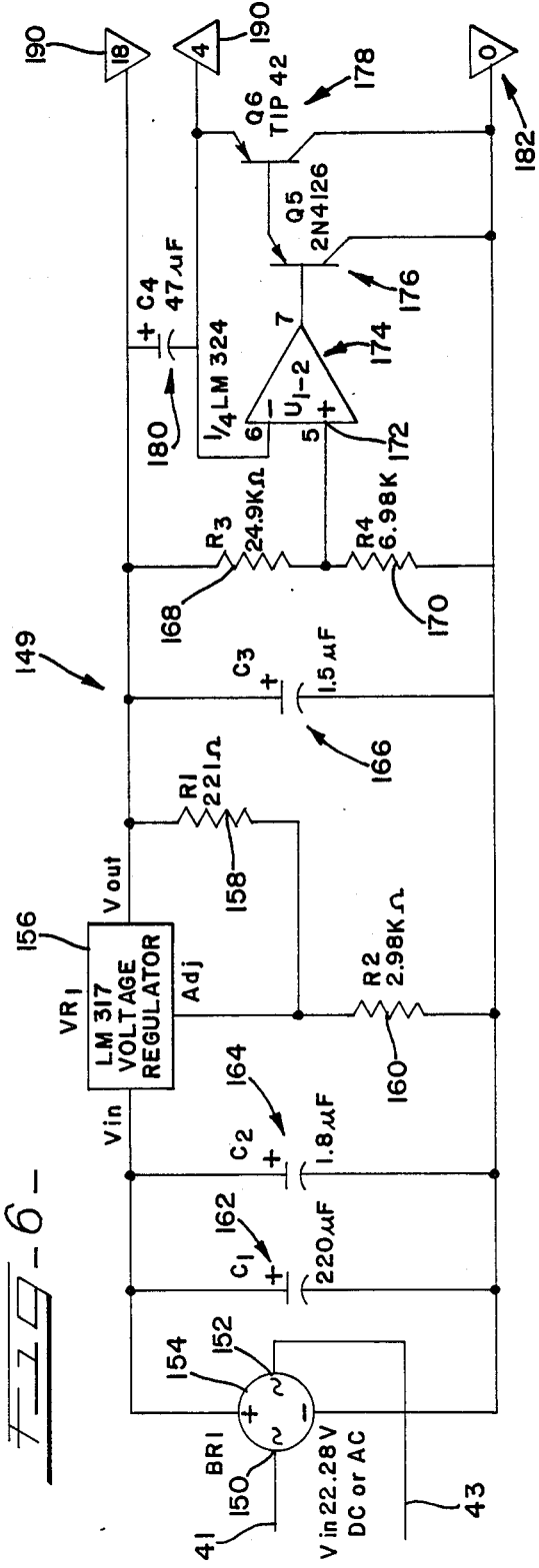
FIG-6-

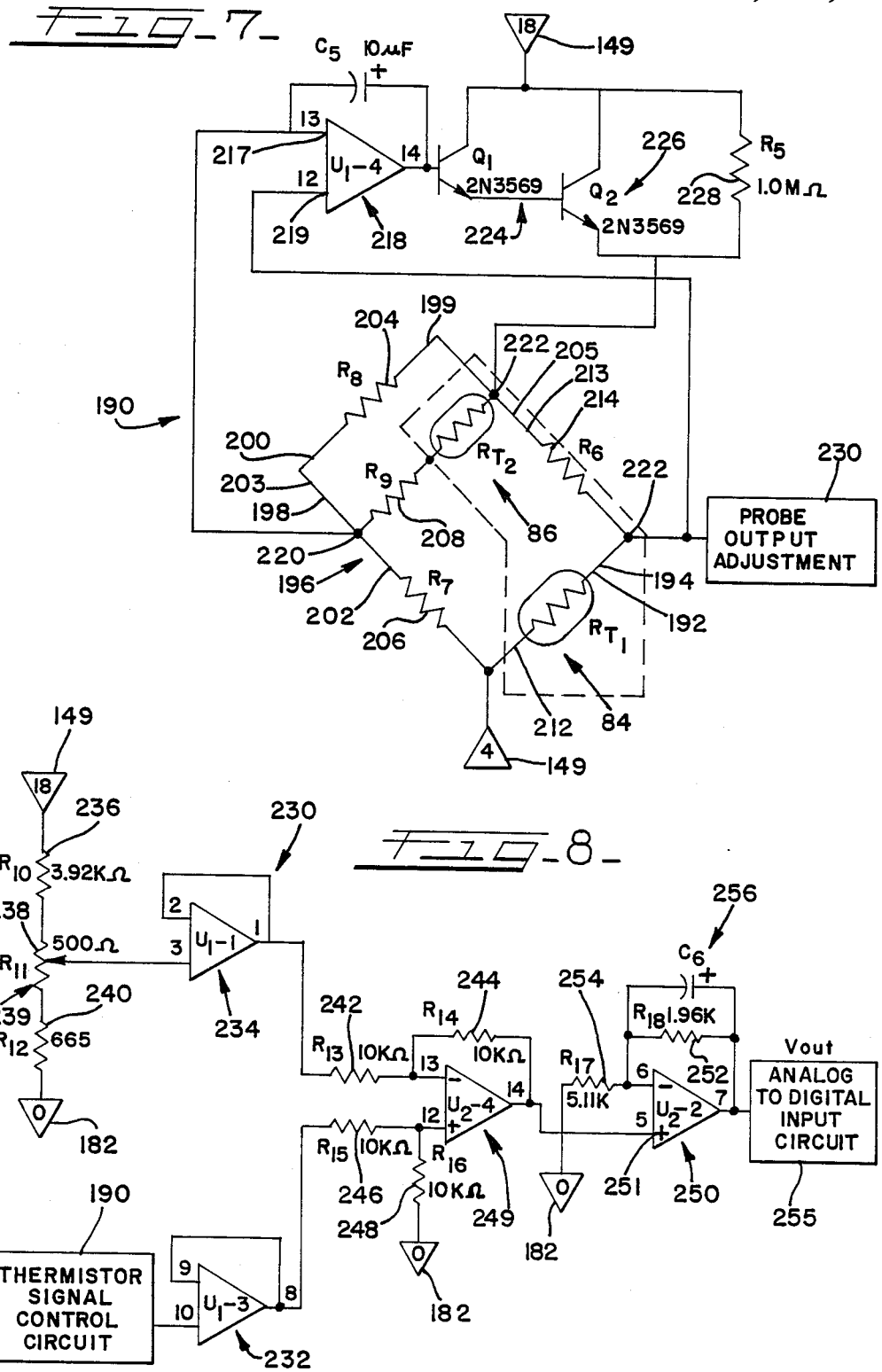

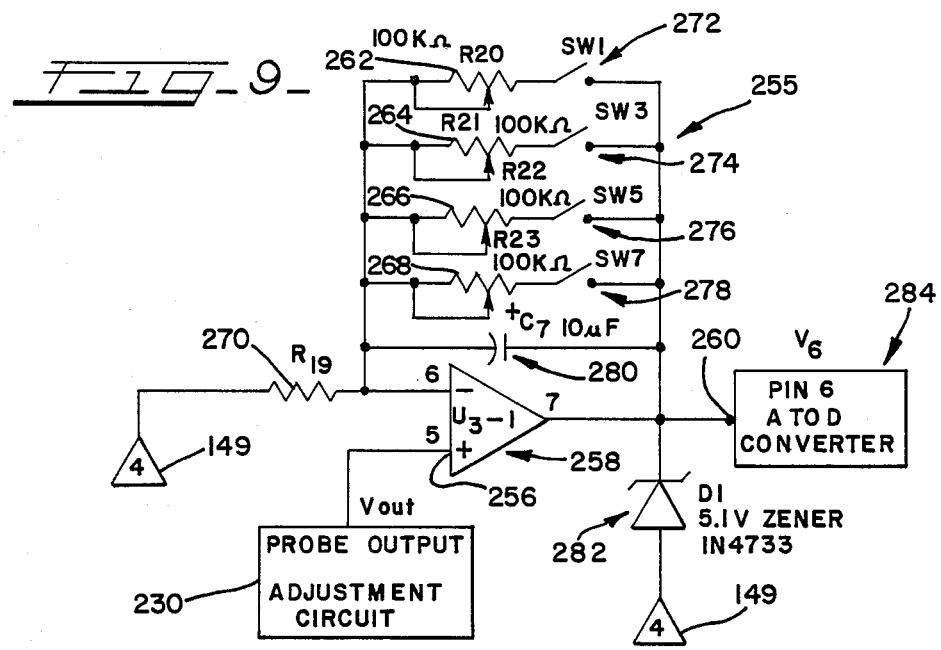

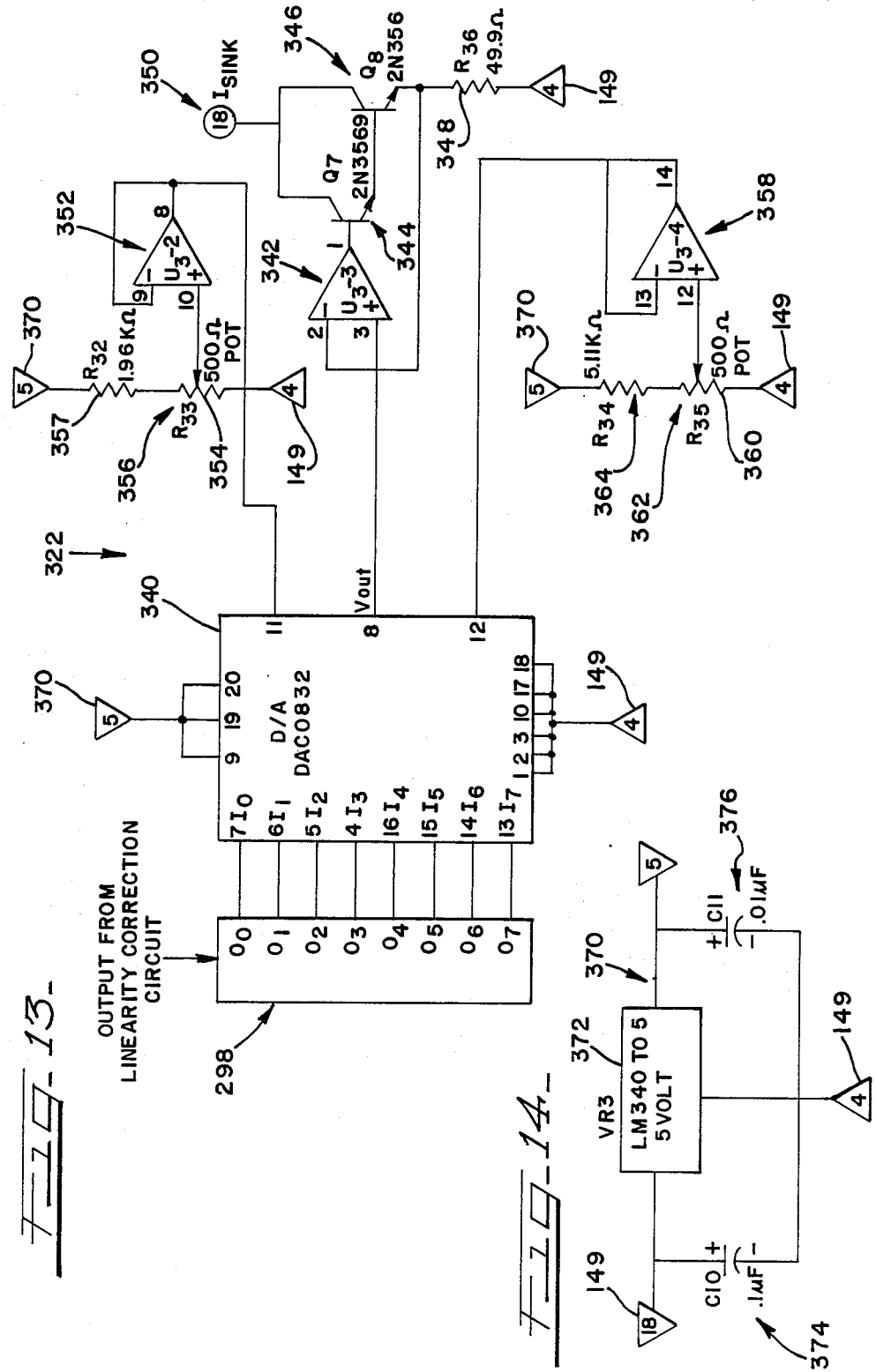

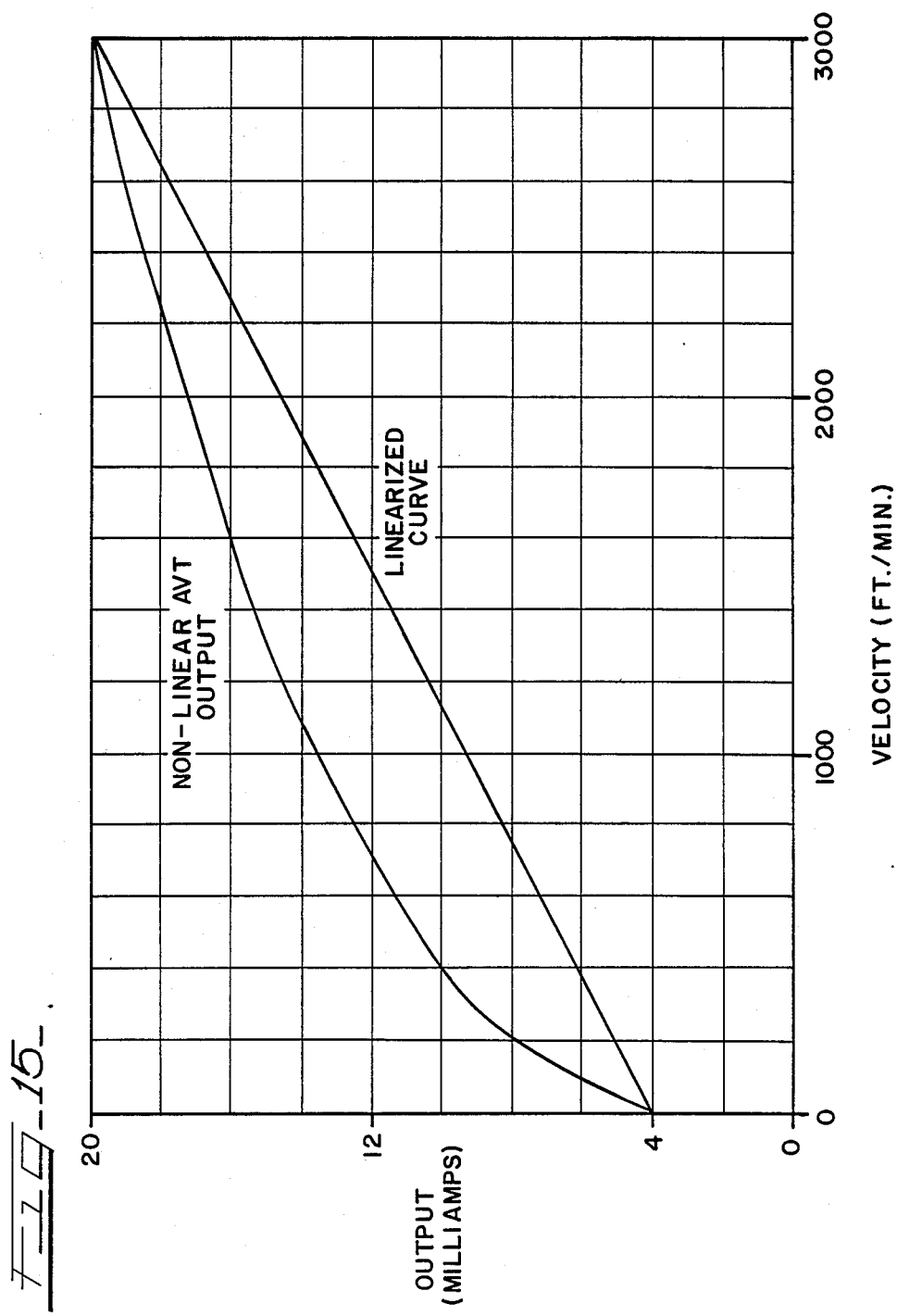

AIR VELOCITY TRANSMITTER DEVICE

This invention relates to an air velocity transmitter, and more particularly, to a device for accurately measuring the velocity of an air flow and providing a linear signal that may be employed to control the operation of commercial and industrial energy management systems, or being employed wherever measurement and control of air or other gas flow is needed.

Wrobel and Ashton U.S. Pat. No. 4,537,068, granted Aug. 27, 1985 (assigned to the same assignor as the instant application), discloses a thermal anemometer arranged to measure air velocity in which the anemometer comprises a probe containing two separate and distinct sensing elements, and a hand held electronic readout unit that contains sensing signal electronic processing circuitry, function control, and an analog readout meter, with the probe and readout unit being interconnected by a self coiling cable. The probe sensing elements are a self heated thermistor and a solid state temperature sensing device, and are separately but simultaneously exposed, in the use of the instrument, to the air flow to be measured, with the energy consumed by the thermistor and its resulting signal, being an indication of both the velocity of the air stream and the difference in temperature between the forced operating temperature of the thermistor and the air stream ambient temperature. The solid state temperature sensing device is a temperature sensing transistor, and develops a signal that is proportional to the air stream temperature. The two signals are electronically combined at the readout unit to eliminate the effect of any ambient temperature variations, to provide an air stream velocity reading at the meter that is independent of ambient temperature.

Devices for measuring air flow and velocity find many uses. However, control of air flow, as distinguished from measuring of same, has proved to be difficult to achieve in this art due to the tendency of signals being generated by thermistors mounted for probe use to generate non-linear signals and the effect of temperature differentials between the operating temperature of the thermistor and the ambient temperature of the air stream being measured.

While the unit of this invention has its major utility in connection with air flow, the unit involved is also fully applicable to any gas flow; consequently, the term "air" as used in this disclosure and claims means both air and other gases, separately or mixed.

A principal object of the present invention is to provide an air velocity transmitter device that not only accurately measures air velocity in either high or low rates of air flow, but also provides a signal that is linear with respect to air velocity that is available, in the use of the device, for instance, control, digitized sensing readout, and/or record keeping purposes.

Another principal object of the invention is to provide an air velocity transmitter device in which a plurality of separate air velocity ranges are available by merely changing the positions of "off-on" switches, with the need for potentiometer adjustment in the field being eliminated.

Yet another principal object of the invention is to provide an air velocity transmitter having an output signal that is independent of temperature variations in the measured air flow.

Still another principal object of the invention is to provide an air velocity transmitter device that may be powered by either direct current or alternating current electrical energy from any convenient external source.

In accordance with the invention, an air velocity transmitter device is provided comprising an anemometer type probe that is employed to measure the air flow, and a housing containing electronic circuitry to which the probe is electrically connected for providing a unit that, when powered by either an alternating current (AC) or direct current (DC) power supply, furnishes, when the probe is utilized, a signal in the industry preferred 4–20 milliamp range that is linear with respect to velocity of the air flow, for remote or local control and/or readout of air velocity.

The unit is powered by electrical connection to any convenient external source of electrical power, that may be either AC or DC in the range of from about 22 to about 28 volts. The probe is applied to one end of the unit cable, the other end of which is electrically connected to the electronic processing and readout circuitry of the unit housing. The probe mounts two separate and distinct sensing elements for exposure to the air stream to be measured and controlled. One of the probe sensing elements is the velocity sensor and is similar to the thermistor of said Wrobel and Ashton patent, it being arranged to be operated in a self heated mode as the velocity sensing element of the unit, and is incorporated in one branch of a self regulating bridge circuit, with the bridge circuit being arranged to force the thermistor to operate at a particular resistance that corresponds to a specific temperature, at 200° C. in the disclosed embodiment. Air movement across the thermistor will cause an increase in the input power required to maintain the indicated operating temperature of the thermistor with the energy being consumed by the thermistor being an indication of both the velocity of the air stream and the difference in temperature between the operating temperature of the thermistor and the ambient temperature of the air stream.

The other sensing element of the probe is in the form of a chip thermistor that forms the opposite arm of the said self regulating bridge circuit, the thermistor chip being located in the probe to sense the temperature of the air flow but it is operated in a mode that is not affected by velocity of the air flow involved. As ambient temperature changes, the chip thermistor increases or decreases its resistance such that the voltage across the velocity sensor is not affected by ambient temperature variations.

The resulting non-linear signal is applied to signal processing circuitry within the unit housing that adjusts same for gain and offset, with the thus adjusted signal being applied to a linearizer circuit that is also within the unit housing, to provide a signal that is linear with respect to air velocity and supplies the 4–20 milliamp signal for the unit, with the linearizer circuit also being arranged to provide multiple velocity ranges by merely changing the position of "off-on" switches.

Other objects, uses, and advantages will be obvious or become apparent from a consideration of the following detailed description and the application drawings in which like reference numerals indicate like parts throughout the several views.

IN THE DRAWINGS

FIG. 1 is an exploded perspective view diagrammatically illustrating an air velocity transmitter unit arranged in accordance with the present invention, with the external electrical power sources being omitted from this view (to simplify the drawing), and with the cable of the unit being shown broken away as the cable can be any desired length, depending on whether the unit housing and associated parts are located adjacent to or removed from the air flow that is to be measured, by the transmitter of FIG. 1;

FIG. 2 is similar to FIG. 1, but shows only the transmitter circuit board and the linearizer circuit board of the unit of FIG. 1, in the same relation as shown in FIG. 1, but on a larger scale;

FIG. 3 is a view of the probe of the unit of FIG. 1, shown on an enlarged scale and largely in section to better illustrate the probe circuit board and sensor devices as well as the probe porting therefor, and showing also the probe end cover in place when the transmitter unit is not in use;

FIG. 4 is a highly simplified representation of the instrument probe sensors and the basic electrical energy sourcing and signal processing circuits that the probe components are electrically associated with;

FIG. 5 is a flow sheet type illustration indicating the different stages of processing of the probe signal that is received from the unit transmitter board to provide the output signal of the unit;

Figure 11:
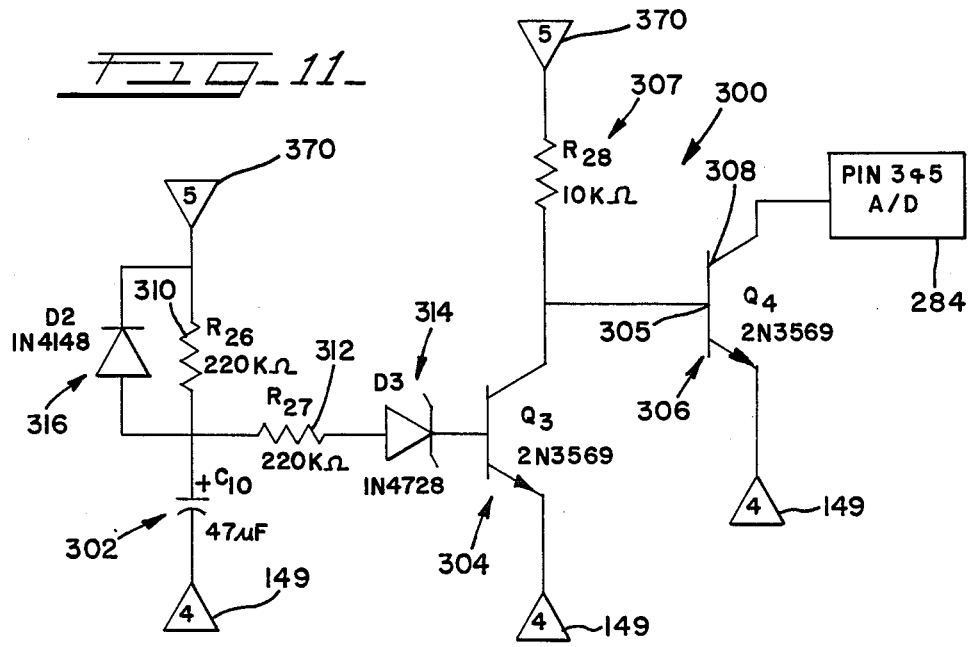
Figure 12:
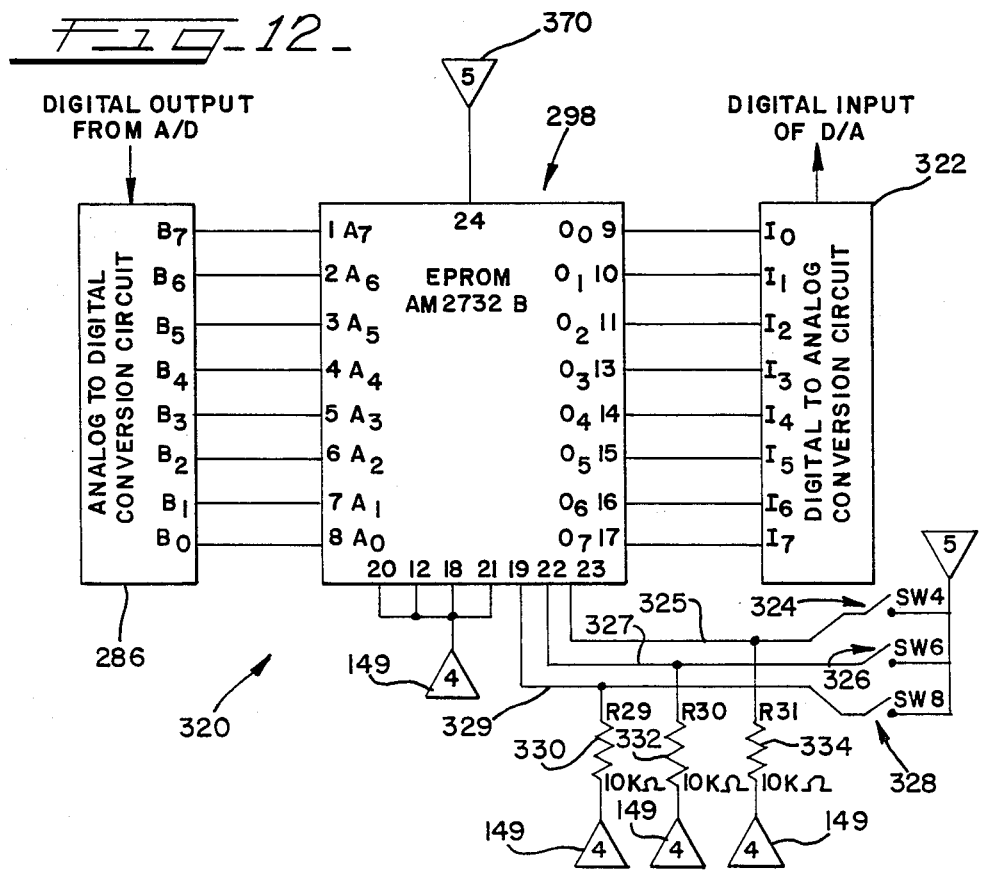

FIGS. 6-14 diagrammatically and schematically illustrate the several circuits or subcircuits that are involved in the unit circuitry, with the individual Figures illustrating the following circuits:

FIG. 6 illustrates the power source and voltage regulator circuit;

FIG. 7 illustrates the thermistor control circuit;

FIG. 8 illustrates the probe output adjustment circuit;

FIG. 9 illustrates the analog to digital input circuit that supplies the amplified signal of the linearizer circuit to an analog to digital converter;

FIG. 10 illustrates the analog to digital conversion circuit;

FIG. 11 illustrates the analog to digital timing circuit;

FIG. 12 illustrates the linearity correction circuit;

FIG. 13 illustrates the digital to analog conversion circuit;

FIG. 14 illustrates the linearizer power supply arrangement; and

FIG. 15 is a graph illustrating the non-linear nature of the velocity sensor output and the linear nature of the output signal provided by the instant invention, for a typical air velocity control installation.

However, it is to be distinctly understood that the drawing illustrations are provided primarily to comply with the disclosure requirements of the Patent Laws, and that the invention is susceptible of modification and variations that will be obvious to those skilled in the art, and that are intended to be covered by the appended claims.

GENERAL DESCRIPTION

Reference numeral 20 of FIG. 1 generally indicates one embodiment of the air velocity transmitting unit or device as a whole, which unit comprises probe 22 that contains the unit or device sensing elements, the housing 24 that houses both the unit transmitter circuit board 26 and the linearizer circuit board 28, as well as the electronic components that are respectively mounted on the respective boards 26 and 28, as well as the housing cover 30 that is normally employed to close off the chamber 32 of the housing 24, and a suitable cable 34 having one of its ends 36 suitably connected to probe 22 and the other of its ends 38 suitably connected to the transmitter circuit board 26 through a suitable conventional liquid tight connector indicated at 40. The housing 24 includes a suitable mounting plate 42 suitably secured to the rear of same, for fixing housing 24 in a desired mounted position that may be adjacent to or remote from the air flow that is to be measured by the unit 20, as will be apparent to those skilled in the art. A second liquid tight connector 40 is applied to housing 24 for similarly accommodating a suitable cable 39 containing in the usual electrically insulated manner power supply conductors 41 and 43 and the linearized signal conductors 45 and 47; the conductors 45 and 47, as diagrammatically indicated in FIG. 1, are suitably electrically connected to and between the circuit of FIG. 13 and, for instance, when a device 20 is used in accordance with the present invention, a conventional controller 49 and/or a conventional digital readout device 51 (provided for either local or remote readout of the air velocity monitored by a device 20). Cable 39 may be of any suitable type having the requisite leads and may be spliced or otherwise conventionally formed to provide the conductors 41, 43, 45, and 47. The conductors 41 and 43 are connected between the source of electrical energy and circuit 149 of FIG. 6.

The housing 24 may be formed from a suitable metal or plastic, and defines side walls 50 and 52, top wall 54, front wall 56 that is suitable apertured to define a relatively large access opening 58 for passing the circuit boards 26 and 28 therethrough to and from the chamber 32 of housing 24. The housing also defines rear wall 60 to which, for instance, separate mounting plates 42 and 51 are suitably affixed, as by welding or using screw type fastening devices or a suitable adhesive. Mounting plates 42 and 51 may be formed with a plurality of screw receiving apertures 62 or the like for mounting the housing 24 in the position desired.

The housing cover plate 30 in the form shown is suitably recessed or dished to be received over the front 63 of the housing 24 and is formed with suitable screw receiving openings 64 that are spaced to be congruent with the threaded screw receiving openings 66 of the housing 24, when cover is received on the housing front 63, whereby the cover 30 may be secured to the housing 24 utilizing fastening screws of any suitable type, to close off the chamber 32.

The circuit boards 26 and 28 may be of any conventional type formed from one of the dielectric plastic materials such as glass epoxy to which the electrical and electronic components about to be described, and that are partially diagrammatically illustrated in the showings of FIGS. 1 and 2, are suitably applied. Board 26 has spaced apart locking circuit board supports 70 suitably affixed thereto having reduced locking end portions 72 for being received through the respective apertures 74 of the board 28 for securing the board 28 to the board 26 when the unit 20 is assembled. Board 26 is also formed with suitable apertures 76 for mounting same to the housing rear wall 60, as by employing suitable mounting screws and the like as well as spacers that may be of a dielectric nature to electrically isolate board 26 from housing 24.

When the circuitry that is diagrammatically illustrated in FIGS. 6-14 is assembled on the respective boards 26 and 28, the board 26 is suitably mounted within the housing chamber 32 and its circuitry appropriately connected to the conductors 41, 43, 45, and 47, probe wiring, and the electronic components of board 28, after which the board 28 may be applied to the indicated position on shanks 70 and secured in place. Cover 30 may then be secured on housing 24 to close off chamber 32.

The probe 22 comprises an elongate tubular member 80 (see FIG. 3) that is preferably formed from a suitable corrosion resistant material such as stainless steel in which is received a single printed circuit board 82, of elongate configuration, on which is mounted the two sensing electronic elements of the unit 20. In accordance with the present invention the circuit board 82 (the solder side, as distinguished from its component side, is illustrated in FIG. 3) mounts conventional bead thermistor 84 (that is to be operated in the self heated mode), and a conventional chip thermistor 86, in the indicated respective circuit board apertures 88 and 90. The circuit board 82 is suitably affixed in position within the tube 80, as by employing adhesive or the like, where indicated at 90, to dispose the respective circuit board apertures 88 and 90 in alignment with aligned apertures 94 and 96 formed on opposite sides of the probe tube 80 (FIGS. 1 and 3 show opposite sides of tube 8), whereby the probe tube apertures 94 and 96, and the respective circuit board apertures 88 and 90 form air stream flow through passages 98 and 100 (see FIG. 1), respectively, that extend transversely thereto. Resistor 214 of the thermistor control circuit 190 (see FIG. 7) is also suitably mounted on the probe board 82 across the board aperture 101 (though the latter is not part of air stream flow through passages of probe 22, these being limited to passages 98 and 100).

The circuit board 82 may be of any conventional type, and defines suitable substrate 102 which has imprinted or delineated on same in any suitable manner, on both sides 104 thereof circuiting 106, in which in the form shown, include pads or terminals 108, 110, 112, and 113, and leads or traces 114 and 116 on the board solder side 104, and other suitable leads or traces that may be necessary on the component side (not shown) with the respective sensors 84 and 86 being connected in the probe circuitry in the manner diagrammatically illustrated in FIGS. 4 and 7 and described hereinafter, and the respective terminals 108, 110, 112 and 113 being connected to the respective lead wires 118, 120, 122, and 124 that are a part of the cable 34 and form conductors back to the electronic circuitry contained within the housing 50, with the connections involved being similarly disclosed.

The probe tube 80 at its air flow through passage providing end 126 is suitably closed by a suitable press or force fitted plug 128, formed from a suitable dielectric material, such as nylon, that is received in the tube end 126 in plug fit relation thereto, with its head 130 in full contact with the tube end rim 132 annularly thereabout. When the unit 20 is not being used, or when a specific probe of same is not being used, the probe end is preferably covered with a close fitting cover 134 formed from vinyl or the like and has its side wall 136 of sufficient length to extend well beyond the pairs of ports 98 and 100 and close same off, as when the unit is not in use. The internal diameter of the cover 130 is proportioned for frictional slip fit application to the tube end 126. When a probe 22 is to be used, the cover 134 is removed from its slip fit applied relation shown in FIG. 3 to open the respective sets of through passages 98 and 100.

The cable 34 may be of any suitable type having the requisite leads, and at its end 36, in the form illustrated, extends through suitable shrink tubing 142 that is suitably shrunk against the end 144 of the probe tube 80, or suitably connected to the tube 80 in any other convenient manner, to present the cable conductors for appropriate solder connection to the circuit board terminals or pads as indicated in any convenient manner. Of course, the tube 80 may be right angled, otherwise angled, or may be straight, as desired.

The probe in use may be mounted in suitable position to monitor a particular air or other gas flow using a conventional liquid pitot type mounting or the like.

Referring now to the power source and voltage regulation circuit 149 of FIG. 6, electrical power in a range of from about 22 to about 28 volts of either direct current or alternating current at a maximum load of about 225 milliamps conducted from a suitable external power source (not shown), as by suitable conductors 41 and 43, is applied to the input terminals 150 and 152 of conventional integrated diode bridge 154 which converts the direct current or alternating current power to strictly a direct current power that is then applied to conventional voltage regulator 156. In the circuit 149 the resistors 158 and 160 are connected in such a manner that the voltage regulator 156 outputs a voltage of 18 volts direct current (nominal) and functions as a source of supply (provides current flow into a load for unit 20). Capacitors 162, 164, and 166 prevent unwanted oscillations by increasing the circuit stability. Resistors 168 and 170 are of such values and are connected in such a manner that a nominal voltage of 4 volts direct current is applied to the noninverting terminal 172 of integrated circuit amplifier 174. The 4 volt direct current is referenced through PNP bipolar transistors 176 and 178 connected in a Darlington configuration such that the 4 volt direct current is a 4 volt direct current sinking supply. Capacitor 180 is for the same general purposes as capacitors 162, 164, and 166. "Ground" is indicated by reference numeral 182.

The circuit 149 is inside the housing 24 and is suitably applied to the board 26, with the board 26 being suitably spaced from the housing rear wall 60 by appropriate spacers. As indicated, the conductors 41 and 43 of cable 39 are suitably connected to board 26 to power circuit 149.

Referring now to the thermistor control circuit 190 shown in FIG. 7, the thermistor 84 is a commercially available bead thermistor that is incorporated in the circuit 190 as one-half 192 of bridge leg 194, of a self excited wheatstone bridge 196 (in subcircuit form), with the bridge other leg 203 having its halves 198 and 199 made up by having its sections 200 and 202 formed by resistors 204 and 206, respectively; the other sensing component of bridge 196, namely conventional and commercially available chip thermistor 86, is connected in series with resistor 208 across the junctions 220 and 222 of the bridge upper and lower legs 203 and 194. The half 205 of bridge leg 194 includes its upper section 213 formed by resistor 214, and its lower section 212 is formed by bead thermistor 84. Similar to the anemometer of said U.S. Pat. No. 4,537,068, the bead thermistor 84 is operated in a self heated mode at a predetermined constant temperature, which in the illustrated embodiment is 200 degrees C. The resistance value of the thermistor at the selected operating temperature of same is determined, and the resistor 214 is selected to have a resistance half that value, with the resistor 206 having a resistance that is twice the value of the resistance provided by the resistor 204 in combination with the resistor 208 and the thermistor chip 86. The amplifier 218 is arranged to have its inputs 217 and 219 connected to the junctions 220 and 222 of the bridge upper and lower legs 203 and 194. The error signal developed between these two junctions causes the amplifier 218 to drive the transistors 224 and 226 to maintain the excitation to the bridge 196 to the value necessary to maintain the resistance of the thermistor 84.

The thermistor chip 86 is provided to correct for ambient air temperature variations; as the temperature of the air flow under test varies, the thermistor chip 86, which is operated at ambient temperature and senses ambient temperature, changes resistance so that the current flow through the bridge 196 is altered, which causes a change in the operating temperature of the bead thermistor 84. This in turn causes the output signal (voltage across the bead thermistor 86) to change in equal but opposite directions to that of the thermal error caused by the temperature variations. Resistors 204 and 208 help provide a smoother temperature control for the chip thermistor 86. Resister 228 is provided to provide a small initial current flow through the bridge 196 so that as the power is supplied the inputs of the amplifier 218 are suitably biased for proper operation.

Referring now to FIG. 8, the probe output adjustment circuit 230 accepts the voltage signal $V_{TH}$ (in terms of voltage) from the thermistor control circuit 190, with the signal involved then being applied to conventional integrated circuit amplifier 232 that is conventionally configured as a buffer in order to isolate the thermistor control circuit 190 from loading caused in by the probe output adjustment circuit 230. The sourcing supply of circuit 149 is connected to "ground" 182 through resistor 236, the resistor 238 of voltage divider 239, and resistor 240, with conventional integrated circuit amplifier 234 being connected to the resistor 238 to create a similar isolated signal $V_Z$ (in terms of voltage), with the signals $V_{TH}$ and $V_Z$ being applied to the respective integrated circuit amplifiers 232 and 234, respectively, through the respective sets of resistors 242 and 244, 246 and 248, such that the output of amplifier 249 is the signal $V_I = V_{TH} - V_Z$.

The signal $V_I$ (in terms of voltage) is applied to the non-inverting terminal 251 of integrated circuit amplifier 250. The output voltage signal of amplifier 250 is characterized by the equation $V_{out} = (1$ plus the ratio of the resistance of resistor 252 as compared to resistor 254) $(V_I)$.

The capacitor 256 is used to eliminate unwanted oscillations by increasing the stability of amplifier 250.

The overall output voltage $V_{out}$ of circuit 230 $= (1$ plus the resistance of resistor 252 over the ratio of the resistance of resistor 254) $(V_{TH} - V_Z)$.

The signal $V_Z$ is used to alter the offset of the signal $V_{out}$. The final $V_{out}$ voltage signal of circuit 230 is connected to the analog to digital input circuit 255 by way of a suitable wire jumper (not shown).

Referring now to the analog to digital input circuit 254 of FIG. 9, the voltage signal from the probe output adjustment circuit 230 $(V_{out})$ is applied to the non inverting output terminal 256 of conventional integrated circuit amplifier 258, with such signal being amplified according to the relationship: the voltage at pin 6 of analog to digital converter 284 equals (1 plus the resistance of the resistor 262 or 264 or 266 or 268 divided by resistance of resistor 270) $(V_{out})$. Thus, the output signal of the amplifier 258 is controlled by any one of the resistors 262, 264, 266, or 268, depending upon which "off-on" switch 272, 274, 276, or 278 is in the closed or "on" relation. The capacitor 280 is employed to stabilize the amplifier 258 and to eliminate unwanted oscillations. The diode 282 serves as a limit (5.1V) on the output of the amplifier 258.

The "off-on" switches 272, 274, 276, and 278 when in their respective closed positions allow separate gains (and therefore velocity ranges) to be independently selected; obviously only one of the four switches 272, 274, 276 and 278 is moved to the closed position at any one time. These switches are part of a conventional dip mounted SPST switch package, in a specific embodiment of the invention.

The output of the amplifier 258 $(V_6)$, which is in the 0–5 DC volt range, as the respective switches 272, 274, 276, and 278 are successively operated, is sent to pin 6 of a conventional analog to digital converter 284 (see FIG. 10). Analog to digital converters, of course, are a familiar form of digital computer integrated circuit device, as are digital to analog converters.

Referring now to FIG. 10, the converter 284 changes each signal that is present at its pin 6 to an eight bit non-linear digital signal, and for this purpose the converter 284 employs a conventional successive approximation potentiometric ladder that is effective to convert the zero-5 direct current voltage range signal to an eight bit digital output signal. Resistor 288 and diode 290 provide a 2.5 volt reference for converter 284, a five voltage sourcing supply being made available for this purpose by conventional regulation of the AC or DC power supply as per FIG. 6, for instance, as shown in FIG. 14. Resistor 292 and capacitor 294 are conventionally arranged to provide the converter 284 with a suitable clock frequency, using resistors 292 and capacitor 294.

The capacitor 296 is used to stabilize the electrical energy supplied to the chip of the converter 284. Outputs $B_0$–$B_7$ are suitably and respectively connected to the respective inputs of the eprom 298, as indicated in FIG. 12.

Referring now to the analog to digital timing circuit 300 as shown in FIG. 11 (see also FIG. 10), the purpose of circuit 300 is to disable the analog to digital converter 284 until the input signal to same, on start up of the unit 20, is stabilized. The voltage across capacitor 302 is initially zero when the power to the unit 20 is "turned on" which, as indicated, provides a five volt DC sourcing supply that is made available to the circuit 300, as indicated in FIG. 11. This condition means that transistor 304 is "turned off" prior to the electrical power being made available to the unit 20. With transistor 304 "turned off", this allows the base 305 of transistor 306 to be pulled up to about the 5 DC volt supply through resistor 307, which in turn causes the collector 308 of transistor 306 (which is connected to pins 3 and 5 of the converter 284), to be held to about the 5 volt level when the power to unit 20 is "off" and for approximately three to five seconds after it is turned "on". As the capacitor 302 charges up to five volts DC, this causes transistor 304 to "turn on", which effects the "turn off" of transistor 306, having the effect of the voltage available at pins 3 and 5 of the converter 284 to drop to about the 4 DC volt supply level.

Resistor 310, resistor 312, capacitor 302, and diode 314 combine to provide the indicated delay of approximately 3-5 seconds. The diode 316 is used to insure the discharge of the capacitor 302 after the power to the unit 20 is "turned off".

Referring now to the linearity correction circuit 320 of FIG. 12, the data bits ($B_0$–$B_7$) of the analog to digital conversion circuit 286, that represent the output signal of the analog to digital conversion circuit 286, are separately connected in any convenient manner to the separate address ports ($A_0$–$A_7$) of the conventional eprom 298. Eprom 298 conventionally contains calculated data (calculated for the present invention at calibration of unit 20) at each of the address ports $A_0$–$A_7$, which collectively form the digital output shown schematically at the right hand side of the showing of the eprom 298 as $0_0$ through $0_7$. The eprom data at each of the indicated eprom address ports $A_0$–$A_7$ is calculated and inserted into memory such that the digital output represented as $0_0$ through $0_7$ changes linearly with air velocity. The calculated data involved is generated or obtained at the time of calibration of the unit 20. The eprom 298 operates electronically to send the linear data involved to the digital to analog conversion circuit 322 (see FIG. 13).

For each velocity reading that has been calibrated for the unit 20, a separate linearization calculation is required. This in turn requires the use of off-on switches to select which velocity range (and therefore linearization calculation) is desired. That is the function of off-on switches 324, 326 and 328, which in practice are a part of the same package of dip mount switches that are found in FIG. 9. Resistors 330, 332, and 334 are used as "pulldowns" to make sure that the range connector lines 325, 327, and 329 are at zero voltage when the respective switches 324, 326 and 328 are open.

Referring now to the digital to analog conversion circuit 322 that is illustrated in FIG. 13, the linearized data from the linearity correction circuit 320 becomes the input signal to the digital to analog converter 340, which then changes the digital signal to an analog signal that is linear with air flow velocity. Amplifier 342 along with transistors 344 and 346, and resistor 348 combine to make a current sink 350 with the following relationship; the amperage of the current sink is greater than the ratio of the voltage output of the linear analog signal to the resistance of resistor 348, where the current sink 350 is drawn from the 18 volt source (circuit 149). The indicated five volt sourcing supply is connected to converter 340, amplifier 352, and amplifier 358 in the manner indicated in FIG. 13. The conductors 45 and 47 are suitably electrically connected with current sink 350 in any conventional manner to supply the needed linearized signal to one or more pieces of equipment of the type referred to in connection with the showing of FIG. 1.

The amplifier 352, in this connection, is employed to set the high limit of the current sink 350 (typically 20 milliamps), based on the value of the resistor 354 in the voltage divider 356 that is comprised of resistor 357 and resistor 354. The amplifier 358 is to set the low limit of the current sink 350 (typically 4 milliamps) based on the value of resistor 360 of the voltage divider 362 comprised of resistor 360 and resistor 364.

Referring now to the linearizer power supply circuit 370 shown in FIG. 14, the voltage regulator 372 serves to maintain a constant voltage of 5 volts in the signal above the 4 volt sinking supply, that may be used as indicated in FIGS. 10-13. The capacitors 374 and 376 are used to remove unwanted oscillations of the output signal provided by the circuit of FIG. 14.

FIG. 15 is a graph illustrating a typical nonlinear signal output from the unit velocity sensor compared to the linearized signal representing the output of unit 20 that is made available for controlling or record keeping purposes for a particular air flow situation to which the invention is applied.

The diode bridge 154 is preferably of the type offered by General Instruments Corp., Discrete Semiconductor Div. of Chicago, Ill. as its Part No. W005M, or its equivalent.

The voltage regulators 156 and 372 are preferably of the type offered by National Semiconductor Corp. of Santa Clara, Calif., as its Part Nos. LM317T and LM340T05, respectively, or their equivalent, respectively.

The analog to digital converter 284 and the digital to analog convertor are preferably of the type offered by the said National Semiconductor Corp., as its Part Nos. ADC0804LCN and DAC0832LCN, respectively, or their respective equivalents.

The bead thermistor is preferably of the type offered by Fenwal, Incorporated, of Ashland, Mass., as its Part No. GB385M43 or its equivalent.

The chip thermistor is preferably of the type offered by Sensor Scientific Inc., of Fairfield, N.J., as its Part No. SC103C2, or its equivalent.

The voltage dividers 239, 356, and 362 may be the voltage divider offered by Bourns, Inc., of Riverside, Calif., or its equivalent.

The dip mounted SPST switch package, referred to with respect to switches 272, 274, 276, 278, 324, 326, and 328, is preferably of the type offered by Grayhill, Inc., of LaGrange, Ill., as its Part No. 78B08, or its equivalent.

The eprom 298 is preferably of the type offered by Advanced Micro Devices, Inc., of Sunnyvale, Calif., as its Part No. AM2732BDG, or its equivalent; see also the 1986 data book of this company.

The remaining electronic components referred to, such as the diodes, transistors, amplifiers and the like are readily available from any company selling routine electronic components, such as the aforementioned National Semiconductor Corp., or Motorola Inc., of Phoenix, Ariz., for example.

It will therefore be seen that the transmitter unit of the invention is arranged to provide an output signal that is linear with respect to the air velocity of an air flow being tested in accordance with the invention; the specific unit described and illustrated provides such linear signal in terms of the familiar 4–20 milliamp signal that is the milliamp range long familiar to this field of endeavor.

The invention also provides for the testing of the air flow involved at three separate velocity ranges by operating conventional "off-on" switches.

The output signal of the unit of this application is independent of the temperature variations of the measured air flow.

The probe is constructed to be insensitive to dust and dirt, which allows the probe to be operated in harsh operating conditions.

The unit disclosed herein can be powered by either a direct current or an alternating current source of supply of electrical energy.

The unit housing 24 may be made suitably waterproof and dustproof in any conventional manner to protect the electronic circuitry it houses.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. An air velocity transmitter unit for providing an electrical output analog signal for measuring and controlling the velocity of an air flow, which signal is linear with respect to such velocity and is independent of the temperature variations of such air flow, said unit comprising:

a thermal anemometer type probe having mounted in same a self regulating bridge circuit that includes in spaced relation longitudinally of said probe a bead thermistor and a chip thermistor, said probe being ported transversely across same at said bead thermistor and said chip thermistor, respectively, for passage of the air flow therethrough about said bead thermistor and said chip thermistor, a source of electrical energy, means for electrically operating said bead thermistor in a self heated mode at a constant predetermined temperature from said energy source to provide a nonlinear thermistor signal in proportion to the velocity and the difference in temperature between that of the bead thermistor and the ambient temperatures of the air flow, means for operating said thermistor from said energy source to provide a signal for canceling out from the thermistor signal the effect on same of the ambient temperatures of the air flow, and means for converting said nonlinear signal to said linear signal, said operating means for said bead thermistor, said operating means for said chip thermistor, and said converting means are contained in a housing separate from said probe, with said probe being electrically connected to said electrically operating means by flexible connector means, said converting means comprising:

means for adjusting said nonlinear thermistor signal for gain and offset to provide a corrected nonlinear thermistor signal, and including linearizer circuit means to which the corrected nonlinear thermistor signal is applied including, an analog to digital converter for changing said corrected nonlinear thermistor signal an eight bit nonlinear digital signal, an eprom that receives the eight bit nonlinear digital signal and has an output signal that is linear with such velocity, and a digital to analog converter that receives the eprom output signal and includes means for controlling the gain and zero setting for said unit output.

2. The air velocity transmitter unit set forth in claim 1 wherein:

said converting means includes means for optionally providing said linear signal for a plurality of velocity ranges.

* * * * *